United States Patent [19]

Shibata et al.

[11] Patent Number: 5,222,437
[45] Date of Patent: Jun. 29, 1993

[54] LEVITATION SYSTEM OF A MAGNETICALLY LEVITATED TRAIN

[75] Inventors: Masayuki Shibata, Hitachi; Naoki Maki, Toukai; Toshio Saitoh, Hitachi; Takashi Kobayashi, Hitachi; Teruhiro Takizawa, Hitachi; Tadasi Sonobe, Iwaki; Shizuo Tsujimoto, Hitachi; Hideshi Fukumoto, Hitachi, all of Japan

[73] Assignee: Hitachi, Ltd., Tokyo, Japan

[21] Appl. No.: 836,598

[22] Filed: Feb. 18, 1992

[30] Foreign Application Priority Data

Feb. 18, 1991 [JP] Japan .................................. 3-23130

[51] Int. Cl.5 ............................................. B60L 13/04
[52] U.S. Cl. .................................................. 104/282
[58] Field of Search ............... 104/281, 282, 285, 286, 104/287, 290, 292, 294, 295, 298

[56] References Cited

U.S. PATENT DOCUMENTS 4,779,538 10/1988 Fujiwara et al. .................... 104/292

FOREIGN PATENT DOCUMENTS 217806 2/1990 Japan .
980821 1/1965 United Kingdom ................ 104/294

OTHER PUBLICATIONS

LD-89-26 Document of the Linear Drive Study Group of the Institute of Electrical Engineers of Japan, 1989.

Primary Examiner—Robert J. Oberleitner
Assistant Examiner—Kevin D. Rutherford
Attorney, Agent, or Firm—Antonelli, Terry, Kraus & Stout

[57] ABSTRACT

A levitation system of a magnetically levitated train is provided wherein superconducting magnets are installed in a car body, and the first layer and the second layer of levitation coils are so arranged as to be in a shifted location relative to each other in the moving direction of the train. By making the levitation coils two layers and by arranging the two layers in the shifted location relative to each other in the moving direction, amplitude of higher harmonic waves is reduced to a very small level, substantially to zero.

16 Claims, 7 Drawing Sheets

UNIPOLAR AMPLITUDE OF EACH HIGHER HARMONIC COMPONENT

FIG. 14
PRIOR ART

# LEVITATION SYSTEM OF A MAGNETICALLY LEVITATED TRAIN

BACKGROUND OF THE INVENTION

1. Field of the Invention

The present invention relates to a levitation system of a magnetically levitated train which travels fast by utilizing the principle of magnetically levitating repulsion.

2. Description of the Prior Art

Figure 13:
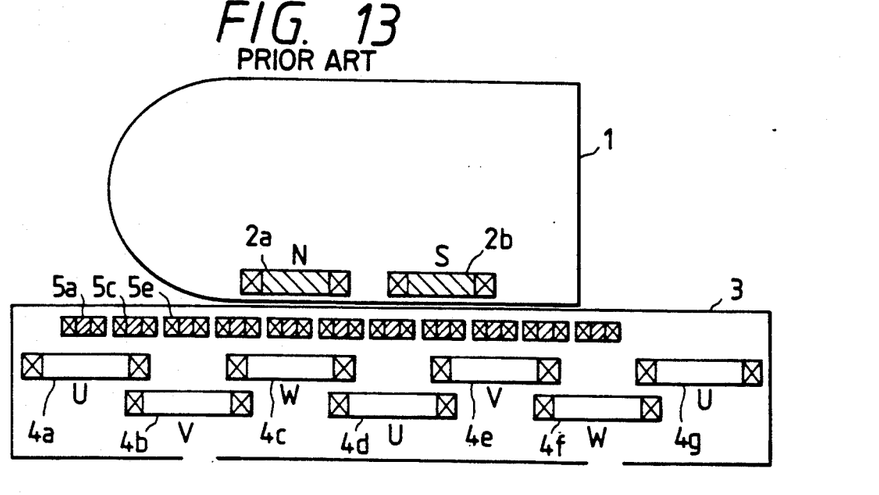
FIG. 13 is a schematic illustration for explanation of a theory of propulsion and levitation of a conventional magnetically levitated train.

In case of a magnetically levitated train using superconducting magnets, such as shown in FIG. 13, the car body 1 having superconducting magnets 2a, 2b for propulsion and levitation is propelled by a moving magnetic field generated by applying three phase electric current having a sine wave waveform to the propulsion coils 4a, 4b, 4c, 4d, 4e, 4f, 4g, which are mounted in the guideway 3 on the ground. The car body 1 is also levitated by repulsive magnetic flux generated in the levitation coils 5a, 5c, 5e, which are installed in the same guideway.

Figure 14:
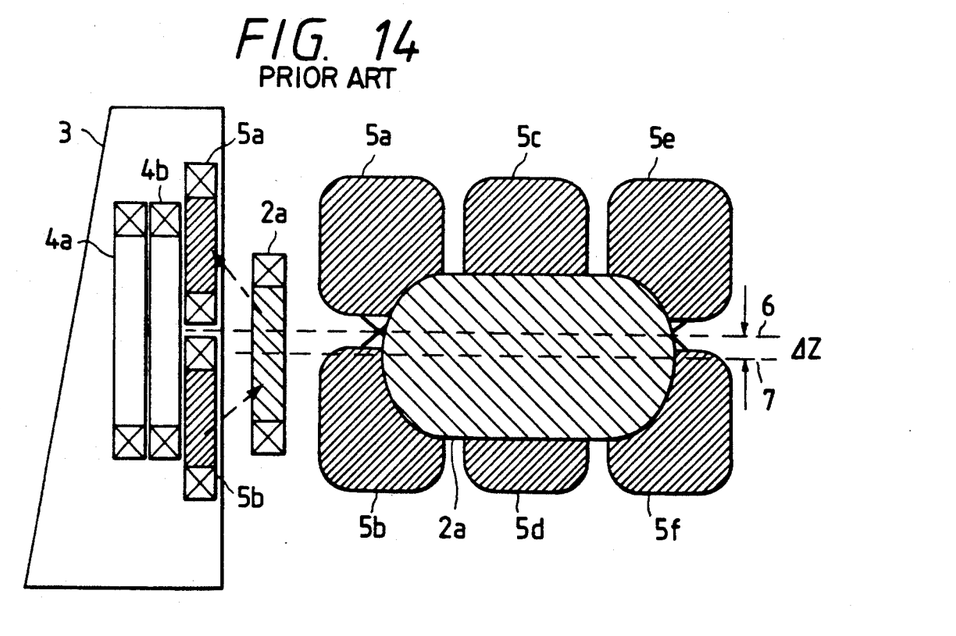
FIG. 14 is a schematic illustration for explanation of a theory of propulsion and levitation of the conventional magnetically levitated train.

The detailed theory of the levitation can be appreciated by referring to FIG. 14 which shows the center line 7 of the vertical direction of the superconducting magnet 2a lowered by $\Delta Z$ from the center line 6 of the levitation coils 5a, 5b, which are connected in a figure eight arrangement by weight of the train. Therefore, in accordance with moving of the superconducting magnet 2a, induced current proportional to the difference between chronical variation of magnetic flux interlinked with the top portion 5a of the levitation coil and chronical variation of magnetic flux interlinked with the bottom portion 5b flows to the levitation coils 5a, 5b. The levitation is performed by utilization of repulsive magnetic flux generated with the induced current.

The levitation system described above, and the force created by the system with the superconducting magnet which is loaded on the car body, are described in, for instance, a document of the linear drive study group of the Institute of Electrical Engineers of Japan, Document No. LD-89-26. This document details a case in which the levitation coils have only a single layer. Another case in which the levitation coils have double layers is disclosed in JP-A-2-17806 (1990). In the latter case, the double layers of coils are entirely overlapped with each other, and the coils are so composed that circuit constant, inductance L, and resistance R of the first layer and the second layer are mutually different. Since n pieces of the levitation coils are installed corresponding to two poles of the superconducting magnet, higher harmonic waves of spatial $mn \pm 1$ order (m=0, 1, 2, . . . , integer) are observed as chronical mn order higher harmonic waves at a position of the superconducting magnet. For instance, in a case of n=6, spatial higher harmonic waves of 1st, 5th, 7th, 11th, and 13th order, and chronical higher harmonic waves of 0th, 6th, and 12th order are observed.

In accordance with the above described prior art, since the levitation coils either of a single layer or double layers are entirely overlapped with each other, chronical n order, for instance 6th order, higher harmonic waves having large amplitude are generated. This results in higher harmonic wave effects to the superconducting magnet, and can cause quenching of the superconducting magnet in a worst case situation. The present invention was developed in view of the above described problems.

SUMMARY OF THE INVENTION

1. Objects of the Invention

One of the objects of the present invention is to provide a levitation system by arrangement of levitation coils so as to reduce the above described higher harmonic waves.

Another object of the present invention is to provide a levitation system having levitation coils so shaped as to reduce the above described higher harmonic waves.

Another object of the present invention is to provide a levitation system having levitation coils shaped so as to equalize strengths of magnetic fields generated by the first layer of the levitation coils and the second layer of the levitation coils at a position of the superconducting magnets.

Another object of the present invention is to provide a levitation system which comprises levitation coils having a circuit constant which is able to equalize strengths of magnetic fields generated by the first layer of the levitation coils and the second layer of the levitation coils at a position of the superconducting magnets.

A further object of the present invention is to provide a particular shape of the levitation coils located at both ends of a block which is composed by gathering together several or a large number of the levitation coils.

2. Methods Solving the Problems

In accordance with the present invention, a levitation system of a magnetically levitated train is provided in which levitation coils are provided in double layers, wherein the layers are so arranged that each of the first layer and the second layer is located at a mutually shifted location in a moving direction of the train.

Further, in accordance with the present invention, the levitation system or a magnetically levitated train is provided in which the second layer is located at a shifted location in the moving direction relative to the first layer location by a half of the coil pitch.

Further, in accordance with the present invention, a levitation system of a magnetically levitated train is provided in which the levitation coils have an arrangement that the col pitch of the levitation coils of the first layer and the second layer are 360°/n (where n is an integer) respectively when length of the two poles of the superconducting magnet is selected to be 360° in electrical angle.

Further, in accordance with the present invention, a levitation system of a magnetically levitated train is provided in which the levitation coils have the ratio of CL/CP between 0.5 and 1 when the coil pitch of the first layer or the second layer of the levitation coils is expressed as CP and length of the magnet in moving direction is expressed as CL.

Further, in accordance with the present invention, a levitation system of a magnetically levitated train is provided in which the levitation coils having two layers are so arranged that the layers obliquely cross over each other.

Further, in accordance with the present invention, a levitation system of a magnetically levitated train is provided in which the levitation coils have such a shape that length in a moving direction and length in a vertical direction of the second layer of the levitation coils are larger than corresponding ones of each of the length in the moving direction and the length in the vertical direction of the first layer of the levitation coils.

Further, in accordance with the present invention, a levitation system of a magnetically levitated train is provided in which the levitation coils have such a circuit constant that inductance L2 and resistance R2 of the second layer of the levitation coils are smaller than corresponding ones of each of the inductance L1 and the resistance R1 of the first layer of the levitation coils.

Further, in accordance with the present invention, a levitation system of a magnetically levitated train is provided in which the levitation coils have such a shape that, when taking a group of several or a large number of the levitation coils as a block, length in the moving direction of the levitation coils at each of both ends of the block is selected to be smaller than the length in the moving direction of other levitation coils.

In accordance with the present invention, the levitation coils had two layers, and the layers were so arranged as to be in mutually shifted locations relative to one another. Accordingly, amplitude of the higher harmonic waves become small, and the degree of the effect on the superconducting magnets decreased.

Further, as the second layer of the levitation coils was so arranged as to be in a location shifted in the moving direction by a half of the coil pitch of the first layer of the levitation coils, the amplitude decreased to substantially zero, or at least a very small value, by mutual cancellation of the low order higher harmonic waves, and the degree of the effect on the superconducting magnets decreased.

Further, as the levitation coils have an arrangement in which the coil pitch of the levitation coils of the first layer and the second layer were selected as 360°/n (where n is an integer), respectively, when the length of the two poles of the superconducting magnet was taken as 360° in electrical angle, the chronical n order higher harmonic waves decreased to substantially zero or a very small value, and degree of the effect on the superconducting magnets decreased.

Further, when the coil pitch of the first layer or the second layer of the levitation coils was expressed as CP and CL, the amplitude of the higher harmonic waves became small by arranging the levitation coils to have a ratio of CL/CP between 0.5 and 1, and the degree of the effect on the superconducting magnets decreased.

Further, as the levitation coils having two layers were so arranged that the layers obliquely crossed over each other, the effect by the first layer and the effect by the second layer became the same, and the effect on the superconducting magnets became uniform.

Further, as the levitation coils have such a shape that the length in moving direction of the train or length in the vertical direction of the second layer of the levitation coils are larger than corresponding ones of each of the length in the moving direction or the length in the vertical direction of the first layer of the levitation coils, the amount of the magnetic flux which crossed over the second layer of the levitation coils which are located farther from the superconducting magnet increased, and induced voltage and induced current were increased. Consequently, strength of the magnetic field at location of the superconducting magnet became the same as the strength at the first layer.

Further, as the inductance, L2, or resistance R2, of the second layer of the levitation coils were made smaller than corresponding ones of each of the inductance, L1, or the resistance, R1, of the first layer of the levitation coils, although the induced voltage to the second layer of the levitation coils which are located farther from the superconducting magnet was low, the induced current by the voltage became large and the strength of the magnetic field at the location of the superconducting magnet became the sam as the strength of the first layer.

Further, when a group of several or a large number levitation coils was made in a block, as the length in the moving direction of the levitation coils at each end of the block was made shorter than the length of the other levitation coils, the shape of the block being kept rectangular as it was, and manufacturing of the levitation coils became easy.

DETAILED DESCRIPTION OF THE EMBODIMENTS

Figure 1:
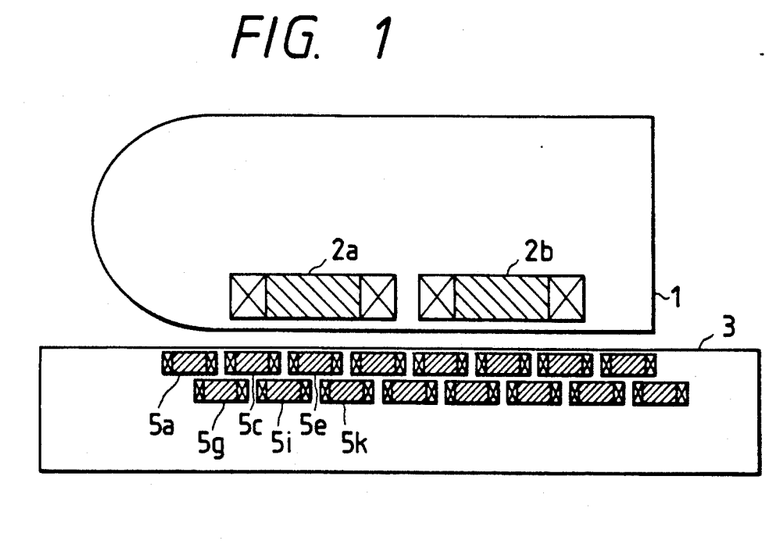
FIG. 1 is a schematic plan view showing an embodiment of the magnet arrangement in a levitation system of a superconducting magnetically levitated train related to the present invention.

Hereinafter, the present invention is explained referring to the embodiments illustrated in the drawings. In FIG. 1, one of the embodiments of the present invention is illustrated. The same numerals are designated to elements that are the same as those explained in the previous description, and further explanation for these numerals is omitted. In the present embodiment, the superconducting magnets 2a, 2b were installed in the car body 1. In the guideway 3, the levitation coils 5a, 5c, 5e were installed as the first layer, and the levitation coils 5g, 5i, 5k were installed as the second layer in the position shifted in moving direction relative to the first layer.

For instance, totally six levitation coils were installed corresponding to two poles of the superconducting magnets in each layer. From the levitation coils of the first layer, for instance, a chronical sixth order higher harmonic wave was generated at the superconducting magnet position. Similarly, a chronical sixth order higher harmonic wave was generated from the second layer, but, as the levitation coils in the second layer were arranged in shifted position to the first layer in the moving direction, the phase of the wave was shifted and amplitude was reduced by mutual cancellation. By arranging the two layers in the manner described above, the effect of the higher harmonic wave on the superconducting magnet was reduced in comparison with the case having only a one layer arrangement.

Figure 2:
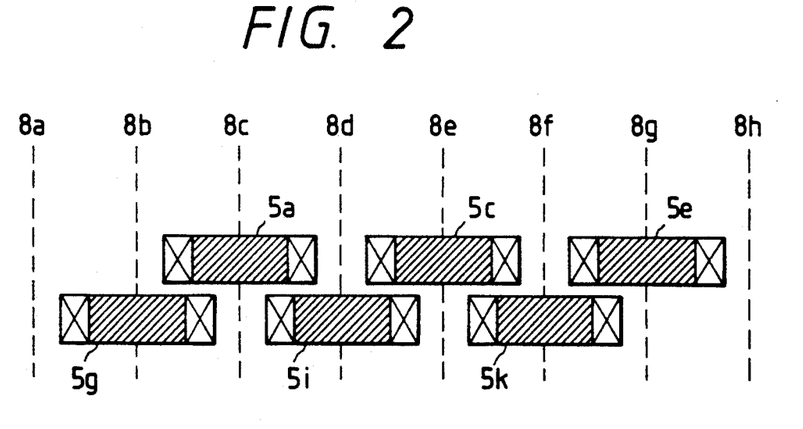
FIG. 2 is a schematic plan view of the levitation coils in another embodiment of the present invention.

In FIG. 2, another embodiment of the present invention is illustrated. In the present embodiment, the levitation coils 5a, 5c, 5e were installed as the first layer, and the levitation coils 5g, 5i, 5k were installed as the second layer in a position shifted by a half of the coil pitch in the moving direction relative to the first layer. For instance, totally six coils were installed corresponding to two poles of the superconducting magnets in each layer. By the arrangement as above described, a spatial sixth order higher harmonic wave generated by the first layer had shifted phase by 180° to the phase of a spatial sixth order higher harmonic wave generated by the second layer, and, accordingly, amplitude was reduced to zero, or at least to a very small value, by mutual cancellation. In the manner as above described, the effect of the higher order harmonic wave on the superconducting magnet was reduced by making the levitation coils have two layers and arranging the two layers in mutually shifted positions relative to each other by a half of the coil pitch in the moving direction. In FIG. 2, the dotted line, 8a–8h, are ancillary lines to express the coil pitch.

Figure 3:
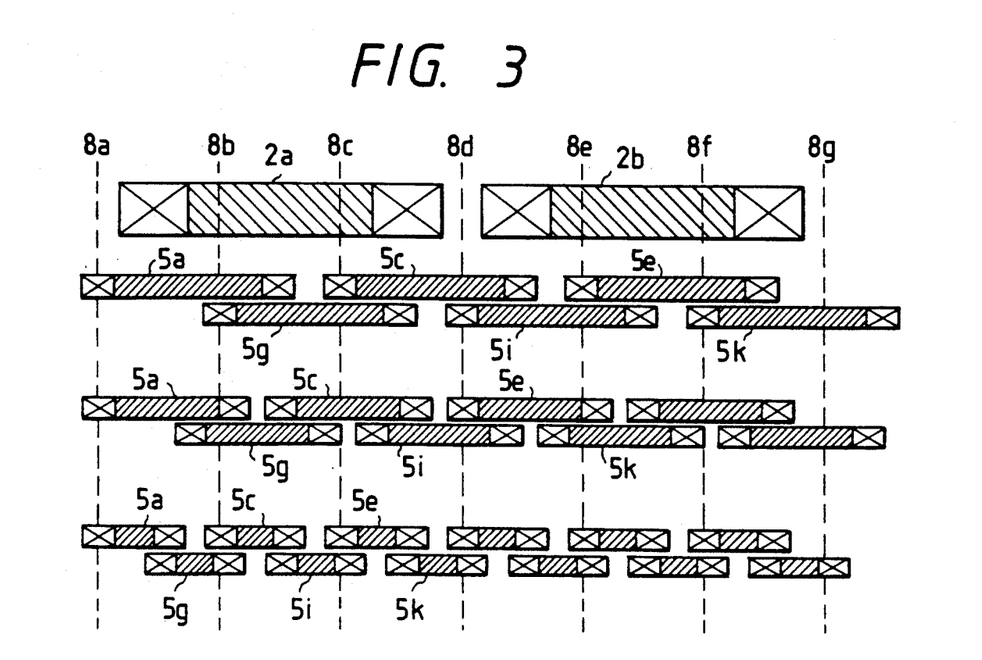
FIG. 3 is a schematic plan view of another embodiment of the present invention in which pitch of the levitation coils is altered variously.

Another embodiment of the present invention is illustrated in FIG. 3. The present embodiment is a case, when length between the two poles of the superconducting magnet was selected as 360° in electrical angle, the levitation coil pitch of the first layer and the second layer were selected as 360°/n, where n=3, 4, 6. By the above-described method, amplitude of chronical third order, fourth order, and sixth order higher harmonic waves which were observed at the position of the superconducting magnets were reduced to zero, or at least very small values.

Figure 4:
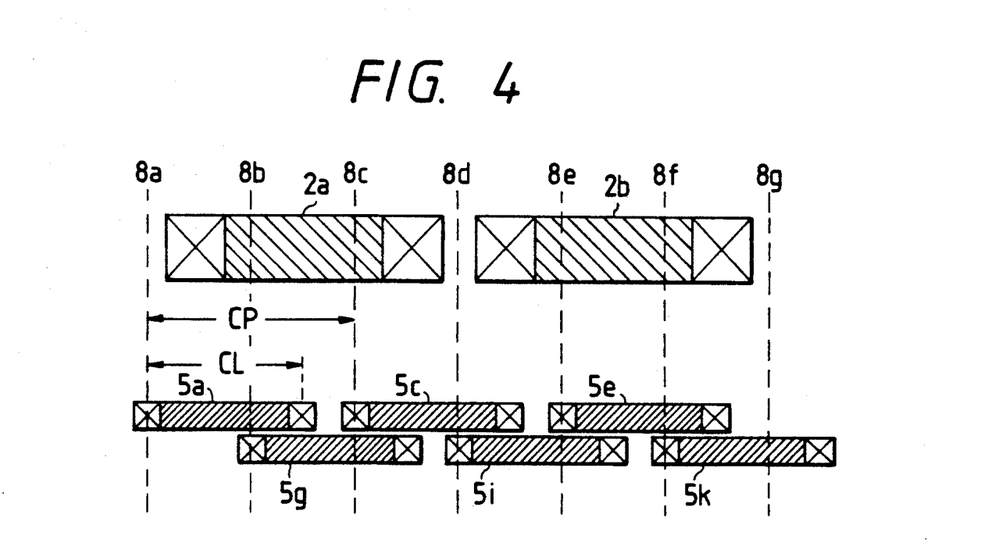
FIG. 4 is a schematic plan view of another embodiment of moving direction of the levitation coils, CL, and the coil pitch of the each layers, CP, is designated as $0.5 < CL/CP < 1.0$.

Yet another embodiment of the present invention is illustrated in FIG. 4. The present embodiment is a case in which the ratio CL/CP was selected to be between 0.5 and 1.0 when coil pitch of the levitation coils of the first layer or the second layer was expressed as CP and the coil length in the moving direction was expressed as CL. By making the levitation coils have partly overlapped portions as the present embodiment, distribution of magnetic field at the superconducting magnet position became smooth. Accordingly, amplitude of the higher harmonic wave was decreased, and the degree of effect on the superconducting magnet was able to be reduced.

Figure 5:
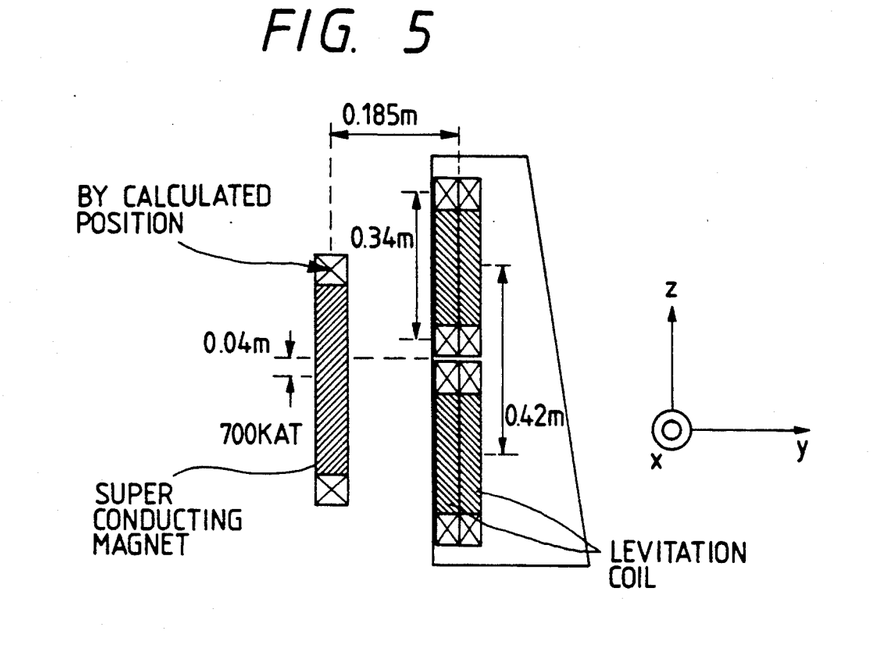
FIGS. 5 to 7 are calculation conditions concerning how much higher harmonic waves can be reduced by the present invention.
Figure 6:
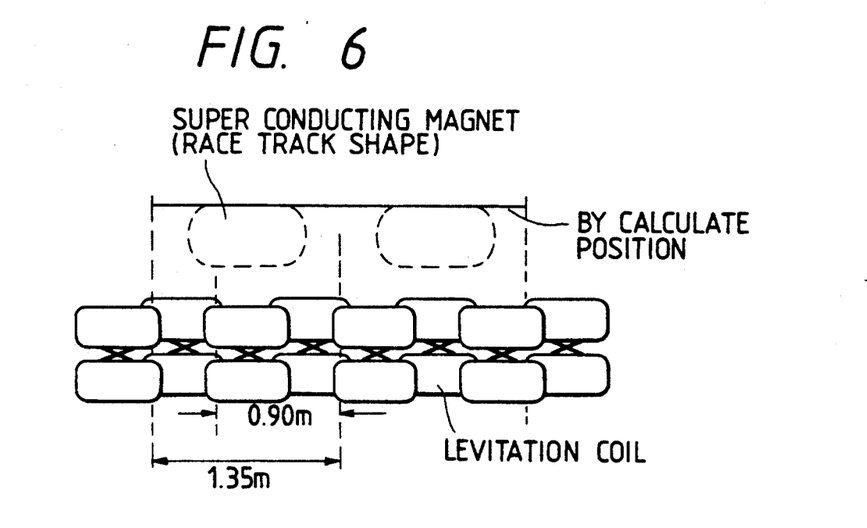
Figure 7:
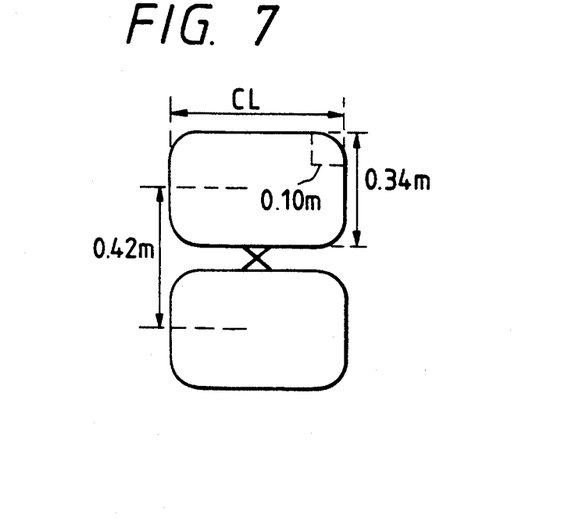
Figure 8:
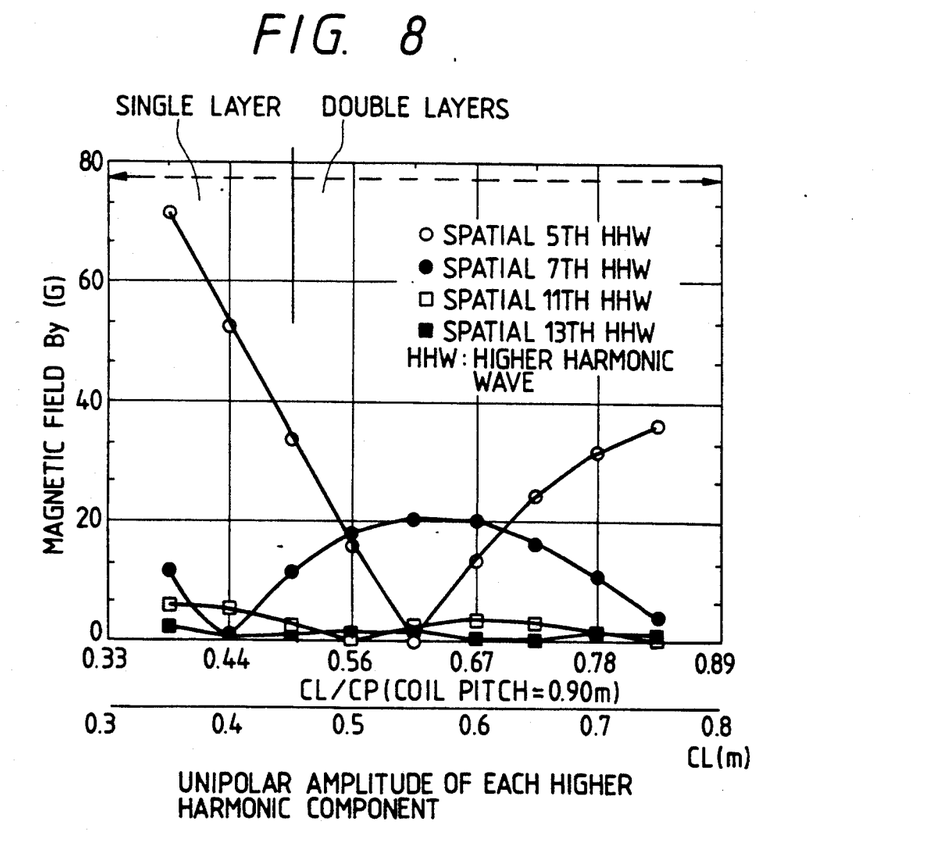
FIGS. 8 and 9 show the result of the calculation as to how much higher harmonic waves can be reduced by the present invention.
Figure 9:
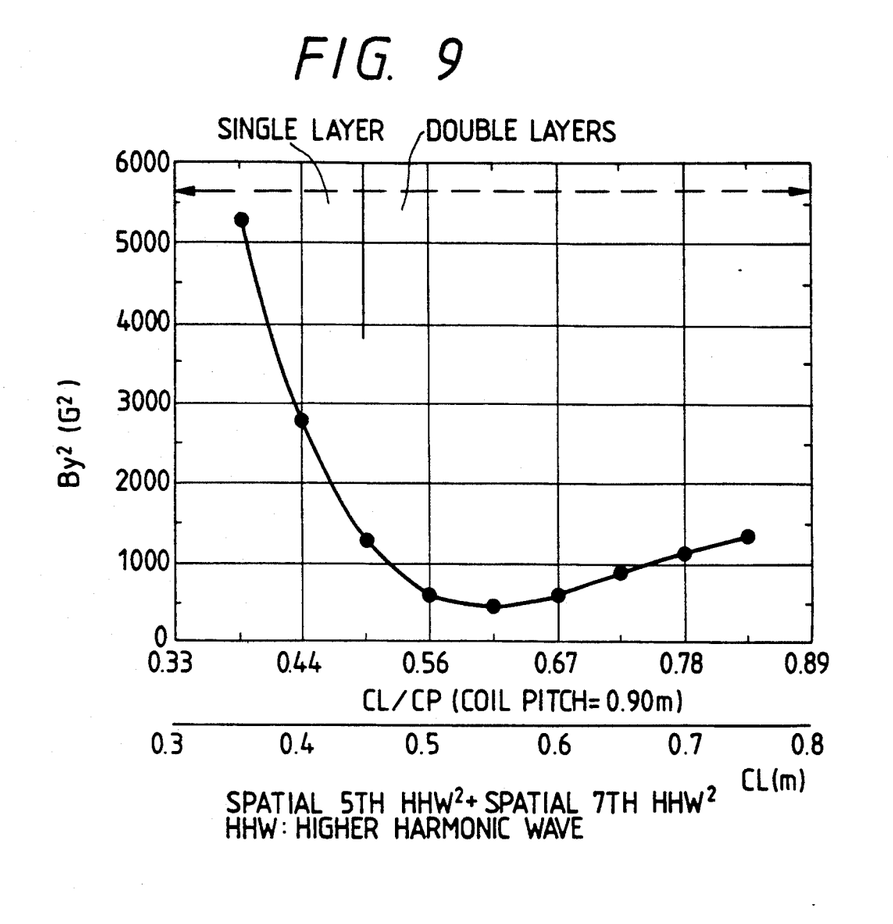

As examples of the above described calculation, the calculation conditions are shown in FIGS. 5, 6 and 7, and the results of the calculation are shown in FIGS. 8 and 9. Referring to FIGS. 5 and 6, the levitation coils were arranged in two layers, and, corresponding to the two poles of the superconducting magnet over a distance of 2.7 m, three coils per one layer were installed. Thus, the levitation coils installed in this manner have a coil pitch CP=0.9 m. The change of the higher harmonic wave contribution in $B_y$ component of the magnetic field was then calculated at the upper periphery of the superconducting magnet in accordance with alteration of the ratio of CL/CP of the length of the linear portion, CL, of the levitation coils and the coil pitch, CP, as shown in FIG. 7. Sine wave current flow having shifted phase by 60° to the levitation coils was postulated, and the effective value of the sine wave current was so selected that unipolar amplitude of the fundamental wave of $B_y$ at the calculation position became 250 G. If the length of CL was longer than 0.9 m, it became three layers. Therefore, the length of CL was necessary to be less than 0.9 m. But, if less than 0.45 m, it essentially became one layer.

The result of the calculation is shown in FIG. 8. More specifically, FIG. 8 reveals that unipolar amplitude of a spatial fifth order higher harmonic wave decreased remarkably when the linear portion CL was long, for instance, 0.55 m, or CL/CP was selected as to be 0.61 and the levitation coils had two layers in comparison with the case when the linear portion CL was short, for instance, at most 0.45 m, or CL/CP was selected as at most 0.5 and the levitation coils had on layer. Although the amplitude of a spatial seventh order higher harmonic wave was rather large at the point where CL/CP is 0.61, the calculation of the sum of the squares of the amplitude of the spatial fifth order higher harmonic wave and the spatial seventh order higher harmonic wave revealed that the minimum value was obtained when CL/CP was 0.61, as shown in FIG. 9.

The above-described case was compared with a case in which the practicable length of the magnet CL was selected, as for instance, 0.35 m in consideration of the thickness of the coil with a one layer arrangement. Since energy is proportional to the same of the squares of the amplitude of the higher harmonic wave, the comparison was performed on the sum of the squares of the amplitude of the firth order and the seventh order higher harmonic wave. As FIG. 9 revealed, selecting CL as 0.55 m was able to decrease the effect on the superconducting magnet to less than 10% of the case selecting CL as 0.35 m.

Figure 10:
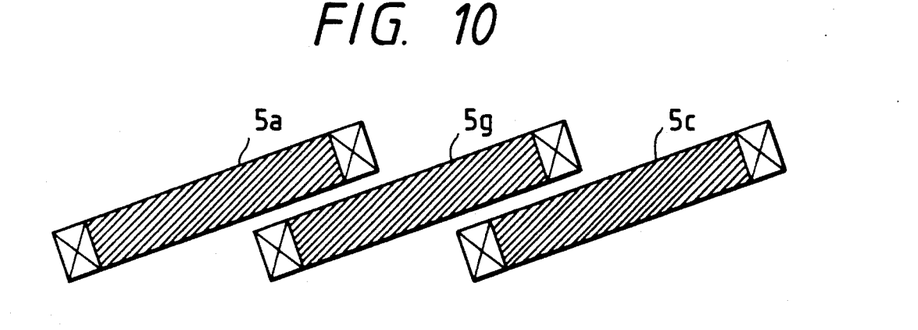
FIG. 10 is a schematic illustration of another embodiment of the present invention in which the levitation coils are arranged in obliquely overlapped positions.

Another embodiment of the present invention is illustrated in FIG. 10. In accordance with the present embodiment, the levitation coil was divided into two layers, and the two layers were overlapped to be obliquely crossing over each other. Consequently, the effect from the first layer and the effect from the second layer became equivalent, and effect of the higher harmonic wave to the superconducting magnet became uniform.

Figure 11:
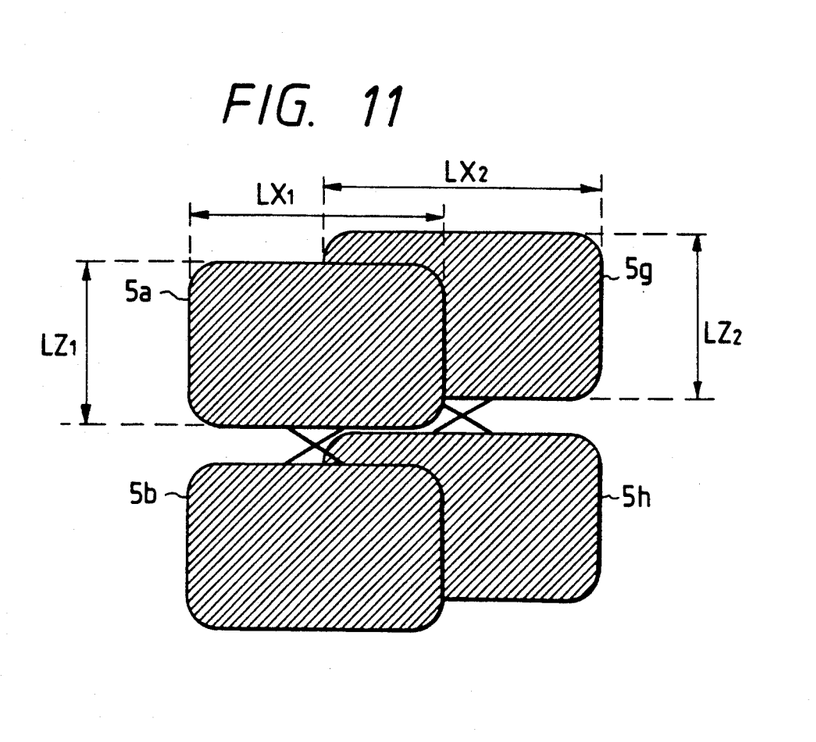
FIG. 11 is a schematic illustration of another embodiment of the present invention in which sizes of the levitation coils at the first layer and the second layer are altered relative to each other.

Another embodiment of the present invention, is illustrated in FIG. 11. The present embodiment is a case in which the length, LX2, in the moving direction or the length, LZ2, in the vertical direction of the levitation coils 5g, 5h in the second layer was selected to be larger than the length, LX1, in the moving direction or the length, LZ1, in the vertical direction of the levitation coils 5a, 5b in the first layer. Therefore, the amount of magnetic flux interlinked to the second layer of the levitation coils which was farther from the superconducting magnet increased. Consequently, voltage and current induced in the second layer of the levitation coils increased, and the strength of the magnetic field caused by the current at the position of the superconducting magnet was equivalent to the strength of the magnetic field caused by the first layer of the levitation coils.

The same effect as the case previously described was able to be obtained by making the inductance, L2, or the resistance, R2, of the second layer of the levitation coils smaller than the inductance, L1, or the resistance, R1, of the first layer of the levitation coils. Consequently, although the induced voltage in the second layer of the levitation coils which was farther from the superconducting magnet was weak, the induced current became large, and the strength of the magnetic field at the position of the superconducting magnet was able to be equivalent to the strength at the first layer.

Figure 12:
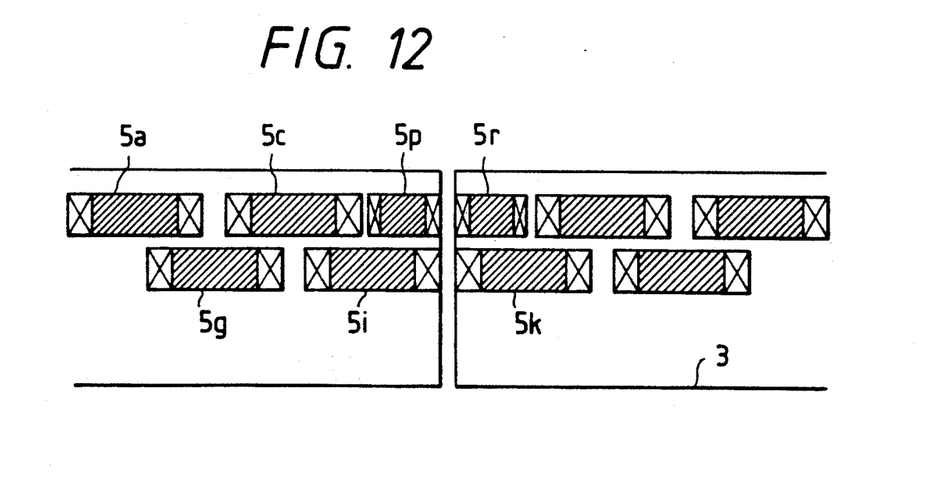
FIG. 12 is a schematic illustration of another embodiment of the present invention in which size of the levitation coils at both ends of a block are altered.

Another embodiment is illustrated in FIG. 12. The present embodiment is a case in which a group of several or many of the levitation coils was made in a block, and the length in the moving direction of each of the levitation coils 5p, 5r are each of both ends of the block was made shorter than the length in the moving direction of the other levitation coils 5a, 5c, 5g, 5i, 5k. Consequently, the shape of the block was kept rectangular as it was, and manufacturing of the block was made easy.

In accordance with the present invention, the following effects are realized.

(1) Amplitude of lower order higher harmonic waves can be reduced to zero or at least a very small value.

(2) By making the strength of magnetic field generated by the levitation coils of the first layer and the second layer at the position of superconducting magnet equivalent, higher harmonic wave components can cancel each other out.

(3) Manufacturing of a block gathering several or many of the levitation coils becomes easy.

What is claimed is:

1. A levitation system of a magnetically levitated train wherein:
   at least one superconducting magnet is installed in a car body,
   current is induced in levitation coils on the ground by a magnetic field generated by the superconducting magnet, and
   a magnetically levitated train is levitated by an electrodynamic suspension level which utilizes mutual reaction of the magnetic field generated by the superconducting magnet and the levitated coils, characterized in that:
   said levitation coils are divided into two layers,
   the first layer of said levitation coils are arranged on a side facing to the train,
   the second layer of said levitation coils are arranged on the reverse side of the first layer, and
   the first layer and the second layer are arranged at a shifted location relative to each other in the moving direction of the train.

2. A levitation system of a magnetically levitated train as claimed in claim 1, wherein:
   said second layer of the levitation coils is shifted in the moving direction of the train relative to said first layer of the levitation coils by a distance which is half of the coil pitch of the levitation coils.

3. A levitation system of a magnetically levitated train as claimed in claim 1, wherein:
   the coil pitch of said first layer and said second layer of the levitation coils is made 360°/n, where n is an integer and when the length of two poles of the superconducting magnet are selected to be 360° in electrical angle.

4. A levitation system of a magnetically levitated train as claimed in claim 1, wherein:
   when the coil pitch of at least one of said first layer and said second layer of the levitation coils is expressed by CP, and the length in the moving direction of the train of said one of said first layer and said second layer of the levitation coils is expressed by CL, the ratio CL/CP is selected to be between 0.5 and 1.0.

5. A levitation system of a magnetically levitated train as claimed in claims 1 or 2, wherein:
   said two layers of the levitation coils are arranged to overlap each other by crossing one another obliquely.

6. A levitation system of a magnetically levitated train as claimed in claim 1, wherein:
   at least one of the length in the moving direction of the train and length in a vertical direction of said second layer of the levitation coils is made larger than at least one of the length in the moving direction of the train and the length in the vertical direction of said first layer of the levitation coils.

7. A levitation system of a magnetically levitation train as claimed in claim 1, wherein:
   said second layer of the levitation coils has at least one of an inductance and a resistance made smaller than at least one of the inductance and the resistance of said first layer of the levitation coils.

8. A levitation system of a magnetically levitated train as claimed in claim 1, wherein:
   when a group of the levitation coils are made in a block, the length of the levitation coils in the moving direction of the train at each of both ends of the block is made smaller than the length of the other levitation coils in the moving direction of the train.

9. A levitation system of a magnetically levitated train as claimed in claim 1, wherein the first layer and the second layer are arranged at a shifted location relative to each other in the moving direction of the train in a predetermined manner to substantially cancel out predetermined high order harmonic wave generated by the levitation coils.

10. A levitation system of a magnetically levitated train as claimed in claim 9, wherein the levitation coils are shifted relative to one another such that the strengths of the magnetic fields generated by the first layer and the second layer of levitation coils at the superconducting magnet are substantially equal to one another.

11. A levitation system of a magnetically levitated train as claimed in claim 9 or 10, wherein the coil pitch of said first layer and said second layer of the levitation coils is made 360°/n, where n is an integer and when the length of two poles of the superconducting magnet are selected to be 360° in electrical angle.

12. A levitation system of a magnetically levitated train as claimed in claim 9 or 10, wherein when the coil pitch of at least one of said first layer and said second layer of the levitation coils is expressed by CP, and the length in the moving direction of the train of said one of said first layer and said second layer of the levitation coils is expressed by CL, the ratio CL/CP is selected to be between 0.5 and 1.0.

13. A levitation system of a magnetically levitated train as claimed in claim 9 or 10, wherein said two layers of the levitation coils are arranged to overlap each other by crossing one another obliquely.

14. A levitation system of a magnetically levitated train as claimed in claim 9 or 10, wherein at least one of length in the moving direction of the train and length in a vertical direction of said second layer of the levitation coils is made larger than at least one of the length in the moving direction of the train and the length in the vertical direction of said first layer of the levitation coils.

15. A levitation system of a magnetically levitated train as claimed in claim 9 or 10, wherein said second layer of the levitation coils has at least one of an inductance and a resistance made smaller than at least one of the inductance and the resistance of said first layer of the levitation coils.

16. A levitation system of a magnetically levitated train as claimed in claim 9 or 10, wherein when a group of the levitation coils are made in a block, the length of the levitation coils in the moving direction of the train at each of both ends of the block is made smaller than the length of the other levitation coils in the moving direction of the train.

* * * * *